(12) United States Patent
Devecigil et al.

(10) Patent No.: US 12,133,487 B2
(45) Date of Patent: *Nov. 5, 2024

(54) IMAGE-BASED IRRIGATION RECOMMENDATIONS

(71) Applicant: CLIMATE LLC, San Francisco, CA (US)

(72) Inventors: Demir Devecigil, St. Charles, MO (US); Valeriy Kovalskyy, Chesterfield, MO (US)

(73) Assignee: CLIMATE LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,836

(22) Filed: Oct. 10, 2022

(65) Prior Publication Data

US 2023/0031336 A1 Feb. 2, 2023

Related U.S. Application Data

(63) Continuation of application No. 16/708,239, filed on Dec. 9, 2019, now Pat. No. 11,464,177.

(60) Provisional application No. 62/777,736, filed on Dec. 10, 2018.

(51) Int. Cl.
*A01G 25/16* (2006.01)
*G05B 13/02* (2006.01)
*G06F 16/51* (2019.01)
*G06T 7/00* (2017.01)

(52) U.S. Cl.
CPC .......... *A01G 25/16* (2013.01); *G05B 13/028* (2013.01); *G06F 16/51* (2019.01); *G06T 7/001* (2013.01); *G06T 2207/10032* (2013.01); *G06T 2207/30188* (2013.01)

(58) Field of Classification Search
CPC ...... A01G 25/16; G05B 13/028; G06F 16/51; G06T 7/001; G06T 2207/10032; G06T 2207/30188; A01B 79/005
See application file for complete search history.

(56) References Cited

U.S. PATENT DOCUMENTS 10,713,484 B2 * 7/2020 Polzounov ............... G06N 3/08
11,464,177 B2 10/2022 Devecigil et al.
(Continued)

FOREIGN PATENT DOCUMENTS

WO WO2017/099951 6/2017

OTHER PUBLICATIONS

Groeneveld et al., "Correcting Satellite Data to Detect Vegetation Signal for Eco-Hydrologic Analyses", Journal of Hydrology, vol. 344, No. 1-2, dated Sep. 19, 2007, pp. 135-145.

(Continued)

*Primary Examiner* — Chad G Erdman

(57) ABSTRACT

Techniques for providing improvements in agricultural science by optimizing irrigation treatment placements for testing are provided, including analyzing a plurality of digital images of a field to determine vegetation density changes in a sector of the field. The techniques proceed by comparing a distribution of pixel characteristics in the digital images for each field sector to determine sectors in which minimal differences are present. Instructions for irrigation placements and testing may then be displayed or modified based on the results of the sector determinations.

18 Claims, 9 Drawing Sheets

(56) References Cited

U.S. PATENT DOCUMENTS

| | | | |
|---|---|---|---|
| 2012/0101784 A1* | 4/2012 | Lindores | A01B 79/005 |
| | | | 703/2 |
| 2012/0290140 A1 | 11/2012 | Groeneveld | |
| 2013/0116836 A1 | 5/2013 | Abts et al. | |
| 2016/0223506 A1 | 8/2016 | Shriver | |
| 2017/0039449 A1* | 2/2017 | Scharf | A01C 21/007 |
| 2018/0035605 A1* | 2/2018 | Guan | G06V 10/7715 |
| 2018/0132422 A1* | 5/2018 | Hassanzadeh | G06Q 50/02 |
| 2018/0146632 A1* | 5/2018 | Meron | G01N 33/0098 |
| 2019/0107521 A1* | 4/2019 | Riley | G01K 3/14 |
| 2019/0277749 A1* | 9/2019 | Rushing | G06T 7/0004 |

OTHER PUBLICATIONS

Alvino et al., "Remote Sensing for Irrigation of Horticultural Crops", vol. 3, No. 2, dated Jun. 16, 2017, 16 pages.
International Preliminary Report on Patentability issued in International Application No. PCT/US2019/065348, dated Jun. 8, 2021.
International Search Report issued in International Application No. PCT/US2019/065348, dated Apr. 16, 2020.

* cited by examiner

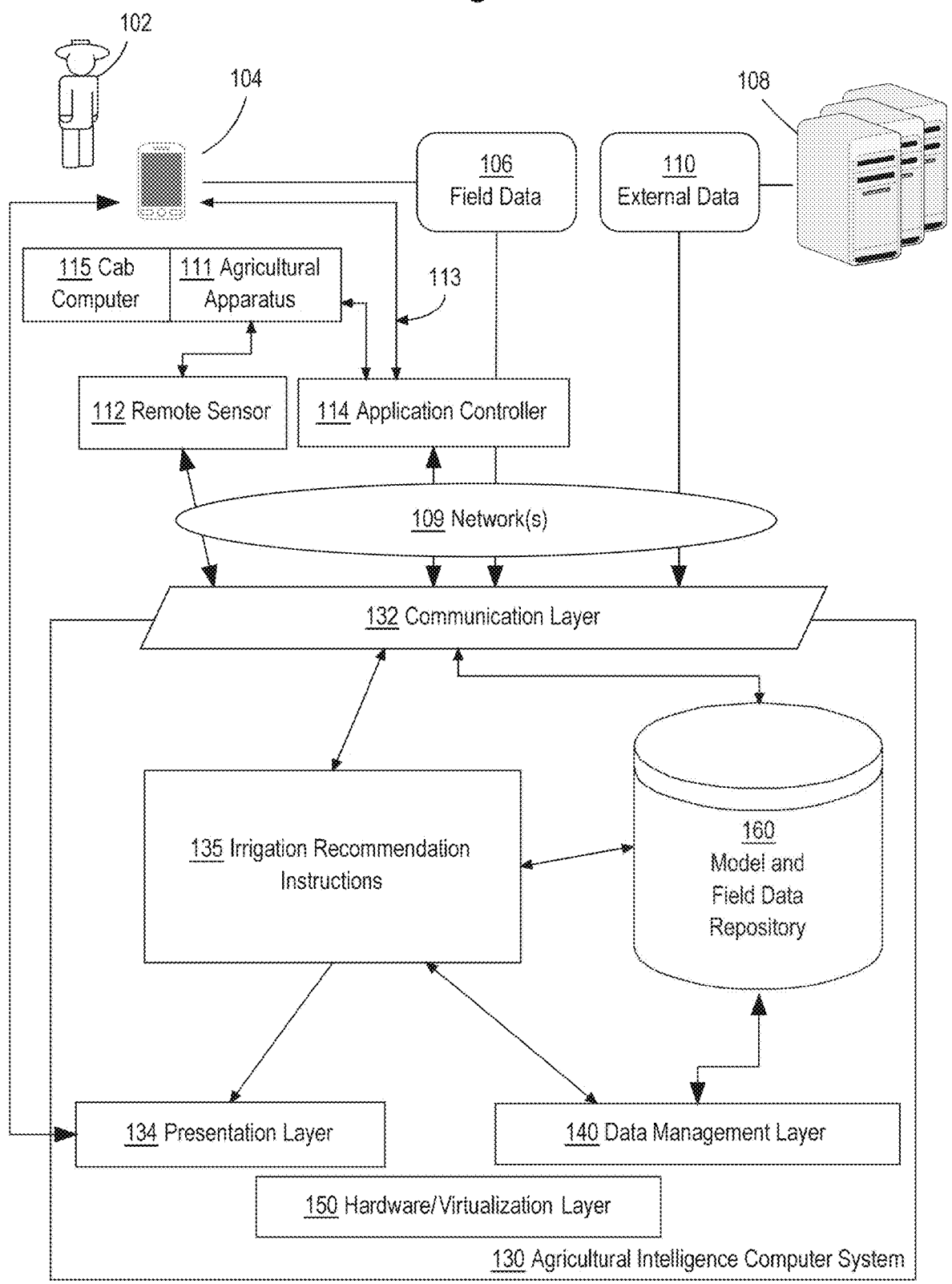

200 Mobile Computer Application

- 208 Seeds and Planting Instructions
- 210 Nitrogen Instructions
- 212 Weather Instructions
- 214 Field Health Instructions
- 216 Performance Instructions 206 Digital Map Book 205 Script Generation Instructions 204 Overview and Alert Instructions 202 Account, Fields, Data Ingestion, Sharing Instructions

(b)

220 Cab Computer Application

- 222 Maps - Cab
- 224 Remote View
- 226 Data Collect and Transfer
- 228 Machine Alerts
- 230 Script Transfer 232 Scouting - Cab

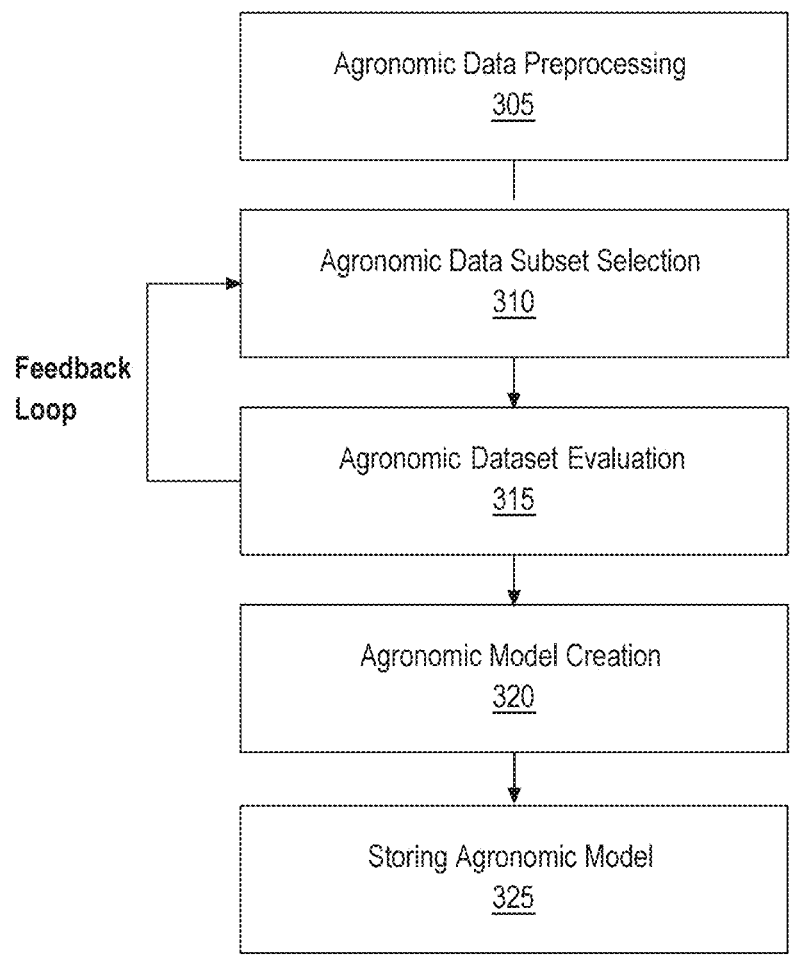

FIG. 5

Data Manager

[ Nitrogen | Planting | Practices | Soil ]

Planting 1 (4 Fields)
Crop Corn Product
Plant Date: 2016-04-12
ILU 112 | Pop: 34000
[ Edit ] [ Apply ]

Planting 2 (0 Fields)
Crop Corn Product
Plant Date: 2016-04-15
ILU 83 | Pop: 34000
[ Edit ] [ Apply ]

Planting 3 (0 Fields)
Crop Corn Product
Plant Date: 2016-04-13
ILU 83 | Pop: 34000
[ Edit ] [ Apply ]

Planting 4 (1 Fields)
Crop Corn Product
Plant Date: 2016-04-13
ILU 112 | Pop: 34000
[ Edit ] [ Apply ]

+ Add New Planting Plan

| | CROP | PLANTED ACRES | PRODUCT | RELATIVE MATURITY | TARGET YIELD | POPULATION (AVG) | PLA |
|---|---|---|---|---|---|---|---|
| ☐ Select All | | | | | | | |
| ☐ Ames, IA 1<br>Corn \| 100 \| Boone, IA | Corn | --- | DMC82-M | 112 | 160 | 34000 | Apr |
| ☑ Austin, MN 1<br>Corn \| 100 \| Fredricks, MN | Corn | --- | DMC82-M | 114 | 160 | 36000 | Apr |
| ☐ Boone, IN 1<br>Corn \| 100 \| Boone, IA | Corn | --- | DMC82-M | 112 | 150 | 34000 | Apr |
| ☐ Champaign 1<br>Corn \| 100 \| Champaign, IL | Corn | --- | --- | 112 | 200 | 34000 | Apr |
| ☐ E Nebraska 1<br>Corn \| 100 \| Burt, NE | Corn | --- | --- | 112 | 160 | 34000 | Apr |

*FIG. 6*

IMAGE-BASED IRRIGATION RECOMMENDATIONS

CROSS-REFERENCE TO RELATED APPLICATIONS

This application is a continuation of U.S. patent application Ser. No. 16/708,239, now U.S. Pat. No. 11,464,177B2, filed Dec. 9, 2019, which claims the benefit of, and priority to, U.S. Provisional Application No. 62/777,736, filed on Dec. 10, 2018, the entire contents of which are hereby incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2018 The Climate Corporation.

FIELD OF THE DISCLOSURE

One technical field of the present disclosure is computer-implemented methods and systems for recommending irrigation timing and amounts in large-scale agriculture. Another technical field is computer-implemented analysis of digital images of agricultural fields taken at high altitude and the use of the digital images in irrigation recommendations. Yet another technical field is computer-implemented recommendation systems for use with agricultural fields that use center-pivot irrigation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Innovation in irrigation to maximize the productivity of fields while effectively managing water use is a continuing goal in agroscience. Computer-implemented irrigation recommendation systems can help growers avoid water waste while also minimizing crop loss and improving yields. The development of computer-implemented support systems for agriculture commonly involves trial execution of new techniques such as recommendations for field treatment including irrigation using the fields of commercial growers. For example, the vendor may formulate an arrangement of two different recommendations and test the recommendations side-by-side in two portions of a field with a third portion of the field devoted to the grower's standard practice. The vendor of the support system is required to pay the growers for the use of their fields for trial purposes.

Until now, growers who use typical center pivot irrigation equipment have been facing an obstacle of pivot technology that precluded use of traditional treatment placement approaches while testing new irrigation management systems. For example, a randomized placement of treatments arranged in rectangular or even small sectoral fashion within one field, which is an industry standard for fare agricultural practice comparison, would not be possible with a broad grower base. Such arrangements would require highly advanced irrigation equipment accessible only to a very small fraction of research facilities. Instead, with typical pivot irrigation equipment, growers had to wastefully use several fields for management system trials, often with different growing condition, which complicates interpretation of trial outcomes. This unnecessary increase in acreage use for experiments often results in increased risks and costs for grower and for irrigation service vendor.

Thus, when comparing outcomes of two or more different irrigation management systems, there is a need to rearrange or modify the placement of treatments within a single field, such that they encompass matching crop growing conditions in the field. This modification of placements would also need to match equipment capabilities available to the broadest irrigation grower base. Disclosed are details of an approach devised to meet these challenges. This new approach sets the promise to deliver fare placement of irrigation treatments, to save grower resources and costs, and to decrease vendor risk and trial associated costs typically required by growers for participation.

Based on the foregoing, for trial placement of treatments in fields with center pivot irrigation, better methods are needed for placing differential treatments both to reduce the impact on growers and to reduce the compensation necessary for the vendor to pay. Better techniques are also needed for assessing the results of trials.

SUMMARY

The appended claims may serve as a summary of the disclosure.

BRIEF DESCRIPTION OF THE DRAWINGS

In the drawings:

FIG. 1 illustrates an example computer system that is configured to perform the functions described herein, shown in a field environment with other apparatus with which the system may interoperate.

FIG. 2 illustrates two views of an example logical organization of sets of instructions in main memory when an example mobile application is loaded for execution.

FIG. 3 illustrates a programmed process by which the agricultural intelligence computer system generates one or more preconfigured agronomic models using agronomic data provided by one or more data sources.

FIG. 5 depicts an example embodiment of a timeline view for data entry.

FIG. 6 depicts an example embodiment of a spreadsheet view for data entry.

DETAILED DESCRIPTION

Figure 4:
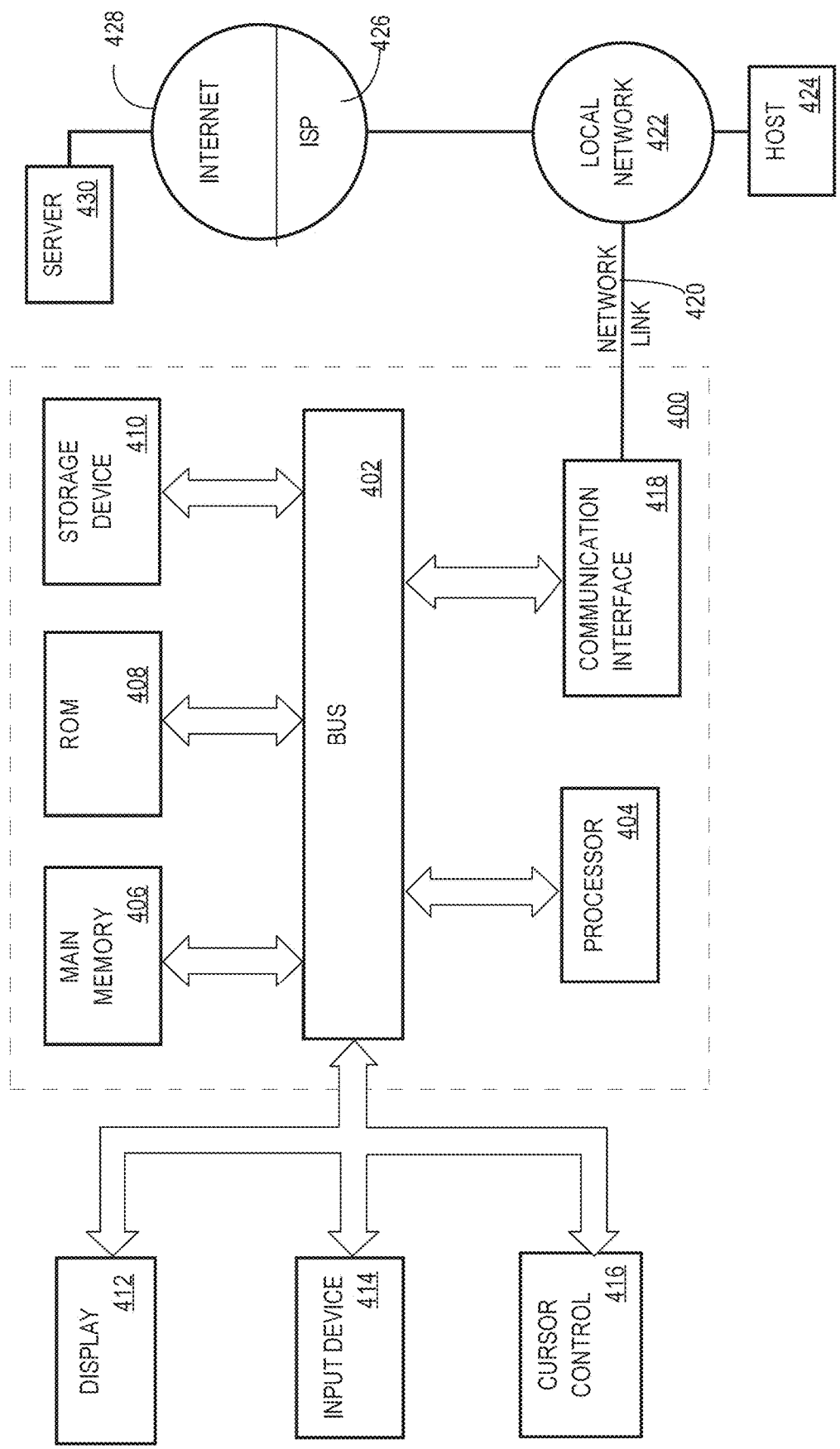
FIG. 4 is a block diagram that illustrates a computer system upon which an embodiment of the invention may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

PRESENTATION DOCUMENT. Furthermore, this specification includes the content of a presentation document that is concurrently submitted herewith. To the extent necessarily under applicable law to provide a complete disclosure of embodiments, the presentation document is hereby incorporated by reference in its entirety for all purposes as if fully set forth herein.

Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. EXAMPLE METHOD OF RECOMMENDING PLACEMENT FOR MULTIPLE IRRIGATION PRACTICES WITHIN ONE FIELD FOR FAIR COMPARISON IN A TEST.

1. General Overview

Digital images captured by satellite or aircraft can serve as a useful source of data about the density of plant growth in an agricultural field as well as other aspects of biological growth or productivity. In an embodiment, image-based measures of biological productivity are used as the measure of growing conditions. By inspecting the variability in biological productivity within a treatment combination, measures of dissimilarity between density histograms can be used to choose the arrangement with the least differences in crop growth conditions, under program control with digital computers. This computer-implemented solution provides a best arrangement of treatments within one field that is using center pivot irrigation, without the need to constrain treatments by acreage.

One goal of embodiments is to compare three different systems of irrigation managements on minimal acreage which would minimize compensation to growers. Placing treatments in different pivots would triple the acreage and compensation. Therefore, all three treatments were placed in one center pivot field over matching crop growing conditions. The challenge with irrigation recommendation is further complicated by the limitation of the center pivot technology which can deliver different treatments to the crop only in sectoral fashion.

Other goals include matching recommendation techniques and their assessment to the capabilities of grower equipment; arranging field management sectors to achieve equal yield per sector under the same management practices; ensuring that results can be reproduced by growers and vendors; and improving the richness and quantity of data that is available to the recommendation systems.

2. Example Agricultural Intelligence Computer System 2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
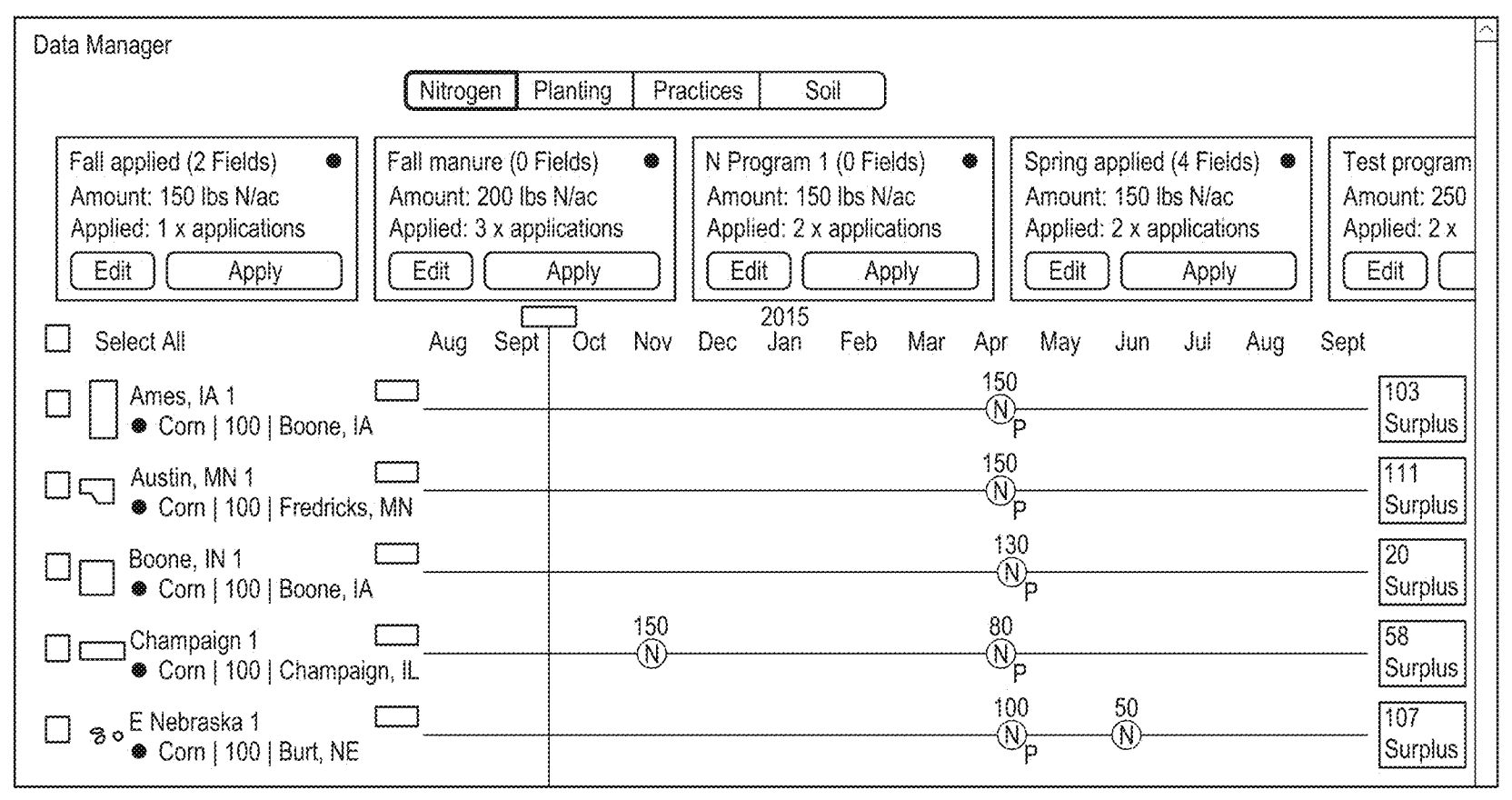

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, irrigation recommendation instructions 135 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, irrigation recommendation instructions 135 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 7:
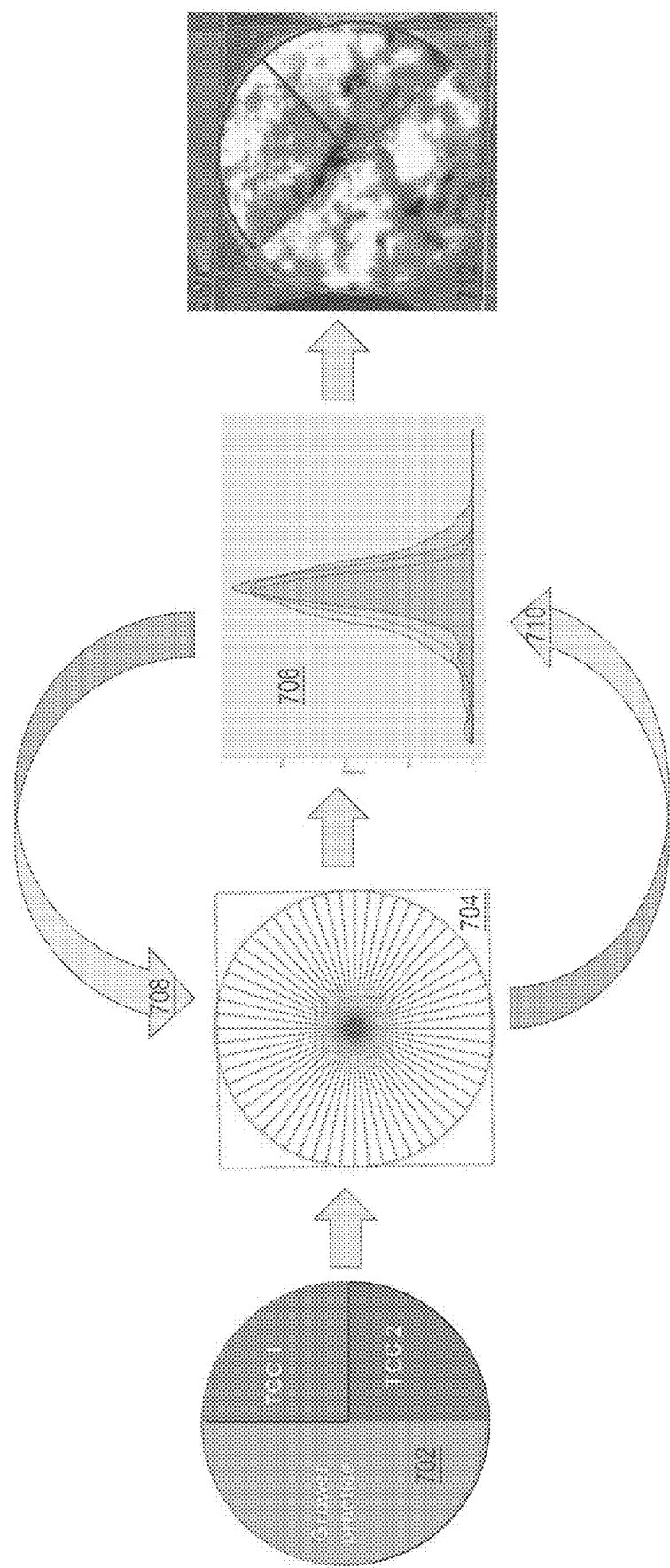
FIG. 7 illustrates an example computer-implemented method of generating irrigation recommendations.

3.0. Example Method of Recommending Placement for Multiple Irrigation Practices within One Field for Fair Comparison in a Test FIG. 7 illustrates an example computer-implemented method of generating sector arrangement at which the irrigation treatments can be compared fairly. FIG. 7 may serve to illustrate, at a conceptual level, the operation of practical embodiments and their benefits. Circle 702 represents a circular field of a grower who uses center point irrigation to apply water to the field. A first field region labeled "Grower practice" is subjected to the grower's normal irrigation practices, while second and third regions TCC1, TCC2 are subjected to trial or experimental irrigation recommendations. Regions of circle 702 may represent actual management practices for a planted field.

Circle 704 represents the same field as circle 702, having been divided for purposes of data representation and analysis into sixty (60) sectors each comprising a six-degree region of the circle. These sectors will be used to perform one iteration step of the analysis needed to capture most fair arrangement for irrigation trials postulated in circle 702. Essentially, in each step the circle 702 is turned 6 degrees, yielding 60 arrangements of the circle 702.

For each of the 60 arrangements of the circle 702, data for a plurality of histograms 706 may be generated and stored, based on satellite image (image 712) content that characterizes growing conditions within a field. Stored histogram combinations then can be used to determine which arrangement of sectors has most similar histograms 706 that capture variability of growing conditions. Hence, the goal of the placement recommendation procedure is achieved, when the combination with closest growing conditions across sectors within circle 702 is found. In other words, at a high level, digital analysis of images, such as image 712, can be used to derive the arrangement of sectors fashioned in circle 702 at which the different management practices can be compared in a test.

In an embodiment, the generation of histograms 706 or other distribution models may be done in cycles. For example, different treatments may be assigned to different sectors of the field. As a result, the field will undergo recalibration 708 in which a digital image corresponding to the new arrangement of field sectors is analyzed. Redistribution 710 may then occur to generate new histograms 706 corresponding to the recalibrated data.

Figure 8:
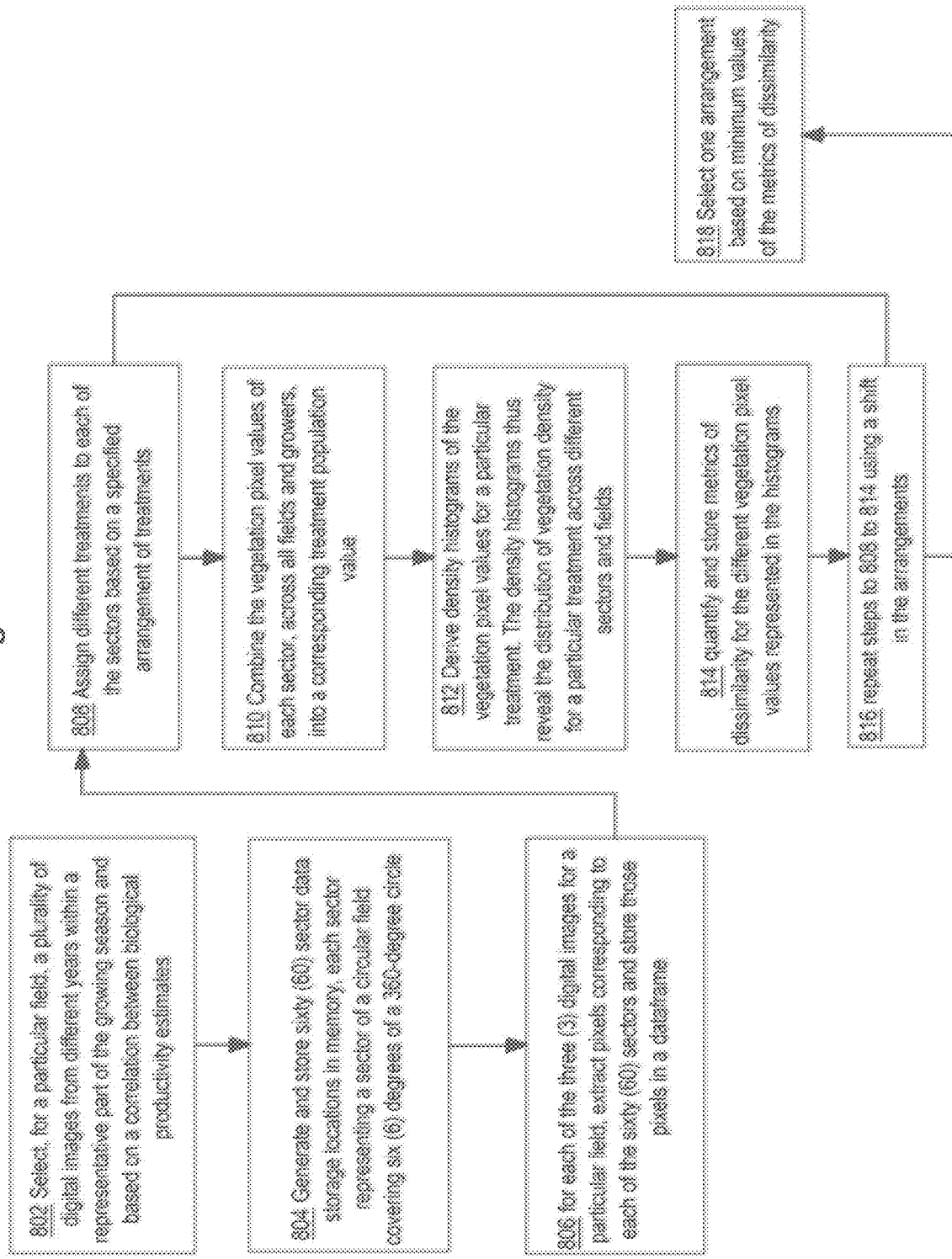
FIG. 8 illustrates an example computer-implemented process that may be used to generate irrigation recommendations in the manner of FIG. 7.

FIG. 8 illustrates an example computer-implemented process that may be used to generate irrigation treatment placement optimized for testing in the manner of FIG. 7. In one embodiment, irrigation recommendation instructions 135 are programmed to implement the operations of FIG. 8.

In an embodiment, at step 802, irrigation treatment placement optimized for testing instructions 135 are programmed to select, for a particular field, a plurality of digital images from different years within a representative part of the growing season and based on a correlation between biological productivity estimates. Digital images for this purpose may be obtained from Sentinel 2A-B or other sources of satellite or aerial images of fields. In an embodiment, a set of three (3) digital images is used. The correlation of a set of three (3) images may be performed by computer-implemented comparison of multiple images of the same field in different years, obtained at the same part of the growing season, to identify images that show approximately the same extent or density of plant growth. For example, a particular field may have ten (10) images each taken in mid-June in different years of the past decade, and the irrigation recommendation instructions 135 are programmed to select three (3) of the ten (10) images that best correlate with respect to the amount of vegetation identified in the images. Techniques for identifying vegetation in satellite images of fields, including digitally separating cloud cover, ponding water and other artifacts, are known in the field and the subject of other publications and patent disclosures. Examples are disclosed in U.S. Pat. No. 9,721,181 B2 and U.S. Pat. No. 10,025,983 B2, and the present disclosure assumes knowledge of those other patent disclosures. Those techniques can be used as foundation to develop images for further comparison and correlation.

The use of three (3) correlated images has been found sufficient for one practical embodiment of the techniques herein, but other embodiments may use other numbers of images.

The fields subject to the techniques herein use center pivot irrigation, and therefore the irrigated portion of the field is circular. At step 804, irrigation treatment placement optimized for testing instructions 135 are programmed to generate sixty (60) sector data storage locations in memory, each sector representing a sector of a circular field covering six (6) degrees of a 360-degree circle. In an embodiment, the sector data storage locations are assigned identifiers of "1" to "60". Other embodiments may use "0" to "59" or other labeling conventions to identify sector data storage locations. The sector data storage locations may be programmed as an array, list or other abstract data structure that is ultimately represented in stored digital memory. Still other embodiments may use sectors of more or less than six (6) degrees and thus may have more or less than sixty (60) sector data storage arrangements.

At step 806, for each of the three (3) digital images for a particular field, irrigation treatment placement optimized for testing instructions 135 are programmed to extract pixel values corresponding to each of the sixty (60) arrangements of the circle 702 and store those pixel values in a dataframe. Pixel values may represent some data or characteristic of pixels taken from the digital images. An example of such pixel values is one or more vegetation pixel values that may comprise values representing some aspect of vegetation in a field captured by a digital image. Aspects used to generate the vegetation pixel values may include measurements such as a density measurement of the vegetation, a color or shade measurement of the vegetation, and/or a growth measurement of the vegetation, based on the digital image.

At step 808, irrigation treatment placement optimized for testing instructions 135 are programmed to assign different treatments to each of the sectors based on a specified arrangement of treatments. The arrangement could be random, serialized or selected according to some other order. The treatments and arrangement may vary according to the goals of a particular trial, experiment or prescription. The details of the treatments and arrangement are not critical to the implementation of the techniques herein. Furthermore, the number of treatments can be less than sixty (60) so that the same treatment is assigned to multiple sectors, or so that some sectors have no assignment of a treatment. The assignment of a treatment to a sector may be programmatically implemented by storing a treatment identifier in a specified attribute of the sector data storage locations. Thus, each sector data storage location may be represented by a dataframe or other data structure having a plurality of individual attributes that can store different data values.

At step 810, irrigation treatment placement optimized for testing instructions 135 are programmed to combine vegetation pixel values of each six-degree sector, across all fields and growers, into a corresponding treatment population value. In this context, vegetation pixel values may be obtained using normalized difference vegetation index (NDVI) values, GBI or CCI values. Yield prediction based on time integrated NDVI image time series is a useful technique that supports the use of NDVI in the present approach, but other data formats can be used.

At step 812, irrigation treatment placement optimized for testing instructions 135 are programmed to derive density histograms of the vegetation pixel values for a particular treatment. The histogram may be derived in any way to show a comparison of the vegetation pixel values for a particular treatment. For example, in an embodiment, one or more density histograms may be derived from measured density values taken from the vegetation pixel values and plotted against a range of predicted yield values. The density histograms thus reveal the distribution of vegetation density for a particular treatment across different sectors and fields.

At step 814, irrigation treatment placement optimized for testing instructions 135 are programmed to quantify and store metrics of dissimilarity for the different vegetation pixel values represented in the histograms. In the foregoing example, three treatments may be considered and a first pair of treatments 1, 2 and a second pair of treatments 1, 3 may be evaluated for minimum difference simultaneously. For each pair, in one embodiment, the quantification of dissimilarity metrics may be calculated using all of the following approaches. Where inversion expressions are given, such as one (1) minus another value, the expression is a transformation of the specified technique to provide dissimilarity rather than similarity.

1. 1-SAM. The spectral-angle-mapper (SAM) technique is described in L. Yan & D. P. Roy, "Large-Area Gap Filling of Landsat Reflectance Time Series by Spectral-Angle-Mapper Based Spatio-Temporal Similarity (SAMSTS)," Remote Sens. 2018, 10(4), 609, available online at https://doi.org/10.3390/rs10040609.
2. Cross entropy. This inherently yields a difference value.
3. Inverse of the P value of the Smirnov Kolmogorov test, that is, (1-SKT_P).
4. Euclidean distance. This inherently yields a difference value.
5. Inverse of the density overlap area metric (1-DOA).

In an embodiment, the score difference between members of a pair may be subjected to a compensation calculation defined as:

(Metric score of treatment 1+Metric score of treatment 2)^2/min(Metric score of treatment 1, Metric score of treatment 2))

In an embodiment, the derived dissimilarity metrics may be combined into one score per treatment pair, by first ranking then normalizing and finally summing the normalized scores for each treatment arrangement. That is, for the first treatment pair and second treatment pair identified above, five (5) different scores are obtained using the five (5) approaches above, which are ranked, normalized and summed.

At step 816, irrigation treatment placement optimized for testing instructions 135 are programmed to repeat steps to 808 to 814 using a shift in the arrangements. In various embodiments, a shift in the arrangements may comprise a change in the irrigation practices or the treatment for a particular field or one or more sectors of a field. For example, a shift in the arrangements may comprise a change in the amount of water and/or a specified time of application of an amount of water at a particular sector as part of a treatment.

At step 818, irrigation recommendation instructions 135 are programmed to select one arrangement based on minimum values of the metrics of dissimilarity. The selected arrangement may form the basis of a recommended irrigation prescription or all or a part of another form of agricultural management prescription. These recommendations may be communicated to growers as part of the graphical user interface for mobile computing devices that has been previously described in other sections. Or, the recommendations may be output in graphically displayed or printed reports. In other embodiments, the recommendations may be used, directly or indirectly, to drive pumps, clocks, sprayers or other elements of irrigation equipment to cause applying water to specified fields in the amounts and at the times indicated in the arrangement that was selected.

The foregoing approach has been found to provide a superior method of distributing treatments for trials placed in fields using center pivot irrigation. The approach herein can reduce the quantity of acreage involved in trials and consequently save on compensations to growers. Unlike past approaches, randomized treatment placement in small sectors is possible with this approach.

Figure 9:
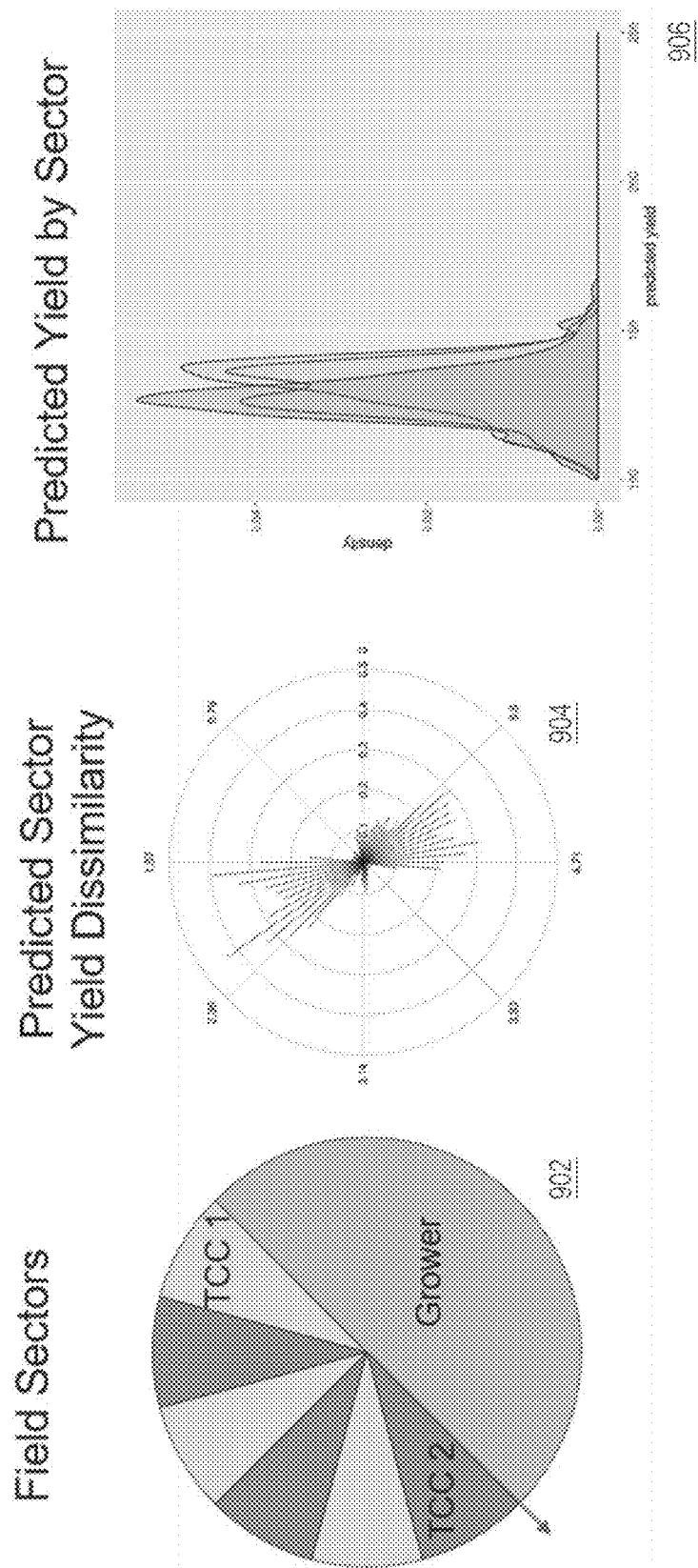
FIG. 9 illustrates an example computer-implemented method of generating irrigation recommendations.

FIG. 9 illustrates an example computer-implemented method of generating irrigation recommendations. FIG. 9 may serve to illustrate, at a conceptual level, the operation of practical embodiments and their benefits. Field sector model 902 may represent the distribution of field sectors in an agricultural field according to various embodiments. As depicted in FIG. 9, field sector model 902 comprises one or more field sectors which implement different manners or arrangements of irrigation treatments at those sectors. In an embodiment, one or more field sectors may use a control or general treatment as a particular treatment to which all other treatments are compared. For example, field sector model 902 comprises a large area labeled "GROWER." A grower may use this particular field sector as a control testing area where regular field operations and treatments are performed.

Field sector model 902 also comprises TCC 1 and TCC 2 as two separate and distinct treatment plans to which the corresponding sectors of the field will be subjected. In various embodiments, an entire field is used as the grower control model. In various embodiments, such as the one depicted in FIG. 9, a portion of a field is used for a control area and remaining areas are used for treatment trials. In various further embodiments, the portion of the field used for a control area is more or less than half the total area of a field. In various embodiments, the entire field is used for treatment trials and a control sector is not employed. In various embodiments, a portion of the field remains unused for either control or trial treatments and the remained of the field is used for control or trial treatments. In various embodiments, all or a portion of the field is used for trial treatments and a separate field is used as a grower control model.

Dissimilarity graph 904 may be used to plot or otherwise convey the results of subjecting one or more field sectors to a plurality of treatments. A graph may be used to display the calculated difference values for yield at the one or more field sectors. For example, dissimilarity graph 904 shows dissimilarity yield results for implemented treatments specified at field sector graph 902. Specifically, dissimilarity graph 904 is a radian-value graph showing the dissimilarity results of the treatments in radian sectors according to the circular field. Dissimilarity values are plotted as protruding from the center of the graph in a degree equivalent to the calculated difference values at a field sector corresponding to the radian at which the line protrudes.

Yield histogram 906 may be used to display or calculate the relationship between a measured density of a field and the predicted yield of a field sector. For example, yield histogram 906 shows the results of the three plans specified in field sector model 902 as measured after the treatments have been performed. In an embodiment data may be derived from yield histogram 906 in order to determine difference values for predicted yield and actual density of a field's vegetation.

In various embodiment, histograms such as yield histogram 906 are used to calculate yield difference values. In further embodiments, the yield difference values are minimized by selecting and applying treatments which will result is lesser difference values among field sectors. In various embodiments, selecting and applying treatments is based on a maximization of histogram similarities between yield histograms. For example, historical models of histograms or other compiled data may be used to generate an ideal histogram which minimizes the total net yield differences between the ideal histogram and the historical models of histograms. In further embodiments, treatments may be selected in a manner corresponding to the expected result of the treatment on the ideal histogram. In various embodiments, a solution for treatment options is derived from statistical measures of historical histogram similarities. In various further embodiments, the solution for treatment options is derived in such a way as to maximize the similarity between historical histograms.

What is claimed is:

1. A method comprising: accessing a plurality of digital images of a field at two or more different time periods, the field being an agricultural growing field and including a circular shape; determining, by a processor, a plurality of field sectors of the circular shape; generating pixel data for each field sector of the plurality of field sectors, the pixel data for a field sector including a characteristic of pixels of the plurality of digital images at the field sector at the two or more different time periods; for each treatment arrangement of a plurality of treatment arrangements: assigning, by the processor, the treatment arrangement to multiple treatment regions, where each of the multiple treatment regions of the treatment arrangement includes a unique combination of multiple field sectors from the plurality of field sectors, relative to the other one(s) of the plurality of treatment arrangements, at least one of the multiple treatment regions subject to an experimental recommendation; and generating, by the processor, at least one probability distribution model of the pixel data for each field sector included in the treatment arrangement, wherein the at least one probability distribution model is one of a yield histogram, a yield dissimilarity graph, or combination thereof; and then determining, by the processor, from the at least one probability distribution model of the pixel data for each treatment arrangement of the plurality of treatment arrangements, which treatment arrangement of the plurality of treatment arrangements represents minimum difference values in the pixel data during the two or more different time periods.

2. The method of claim 1, wherein each field sector of the plurality of field sectors defines an angular subdivision of the circular shape.

3. The method of claim 2, wherein the characteristic of the pixels includes a color measurement or a shade measurement of vegetation.

4. The method of claim 1, wherein the pixel data includes values indicative of one of: a normalized difference vegetation index (NDVI; and a chlorophyll-carotenoid index (CCI).

5. The method of claim 1, further comprising selecting the plurality of digital images from multiple images, based on an amount of vegetation in each of the multiple images; and
wherein each of the multiple images is specific to a unique prior year, at a consistent part of a growing season.

6. The method of claim 1, further comprising generating and displaying probability distribution data, representing the at least one probability distribution model of the pixel data for the treatment arrangement representing the minimum difference values in the pixel data, in a human-readable format.

7. The method of claim 1, further comprising:
positioning irrigation equipment in the field; and
applying the experimental recommendation to the at least one of the multiple treatment regions, consistent with the determined treatment arrangement of the plurality of treatment arrangements representing the minimum difference values.

8. The method of claim 1, further comprising:
generating a field recommendation consistent with the experimental recommendation for the at least one of the multiple treatment regions, which includes an application of water in certain amounts and at certain times to the field sectors assigned consistent with the determined treatment arrangement of the plurality of treatment arrangements; and
driving one or more of pumps, clocks, sprayers and/or other elements of irrigation equipment to apply water to the field sectors consistent with the field recommendation.

9. The method of claim 1, wherein assigning the plurality of the treatment arrangements is based on rotating the multiple treatment regions about an axis of the circular shape of the field.

10. The method of claim 9, wherein assigning the treatment arrangement includes serially stepping the multiple treatment regions through ones of the plurality of field sectors.

11. A treatment system comprising: a database; and a processor coupled to the database and a main memory comprising instructions which, when executed by the processor, cause the processor to perform the steps of: accessing, in the database, a plurality of digital images of a field at two or more different time periods, the field being an agricultural growing field and including a circular shape; determining a plurality of field sectors of the circular shape; generating pixel data for each field sector, the pixel data for a field sector including a characteristic of pixels of the plurality of digital images at the field sector at the two or more different time periods; for each treatment arrangement of a plurality of treatment arrangements: assigning the treatment arrangement to multiple treatment regions, where each of the multiple treatment regions of the treatment arrangement includes a unique combination of multiple field sectors from the plurality of field sectors, relative to the other one(s) of the plurality of treatment arrangements, at least one of the multiple treatment regions subject to an experimental recommendation; and generating at least one probability distribution model of the pixel data for each field sector included in the treatment arrangement, wherein the at least one probability distribution model is one of a yield histogram, a yield dissimilarity graph, or combination thereof; and then determining, from the at least one probability distribution model of the pixel data for each treatment arrangement of the plurality of treatment arrangements, which treatment arrangement of the plurality of treatment arrangements represents minimum difference values in the pixel data during the two or more different time periods.

12. The system of claim 11, wherein each field sector of the plurality of field sectors defines an angular subdivision of the circular shape.

13. The system of claim 12, wherein the characteristic of the pixels includes a color measurement or a shade measurement of vegetation.

14. The system of claim 11, wherein the pixel data includes values indicative of one of: a normalized difference vegetation index (NDVI; and a chlorophyll-carotenoid index (CCI).

15. The system of claim 11, wherein the instructions, when executed by the processor, further cause the processor to perform the step of: selecting the plurality of digital images from multiple images, based on an amount of vegetation in each of the multiple images; and
wherein each of the multiple images is specific to a unique prior year, at a consistent part of a growing season.

16. The system of claim 11, wherein the instructions, when executed by the processor, further cause the processor to perform the step of: generating and displaying, at a field manager computing device, probability distribution data representing the at least one probability distribution model of the pixel data for the treatment arrangement representing the minimum difference values in the pixel data in a human-readable format.

17. The system of claim 11, further comprising irrigation equipment in the field; and
wherein the irrigation equipment is configured to apply the experimental recommendation to the at least one of the multiple treatment regions consistent with the determined treatment arrangement of the plurality of treatment arrangements representing the minimum difference values.

18. The system of claim 11, wherein the instructions, when executed by the processor, further cause the processor to perform the step of:
generating a field recommendation consistent with the experimental recommendation for the at least one of the multiple treatment regions, which includes an application of water in certain amounts and at certain times to the field sectors assigned consistent with the determined treatment arrangement of the plurality of treatment arrangements;
whereby one or more pumps, clocks, sprayers or other elements of irrigation equipment is driven to apply water to the set of field sectors consistent with the field recommendation.

* * * * *